(12) United States Patent
Zhang et al.

(10) Patent No.: US 7,061,140 B2
(45) Date of Patent: Jun. 13, 2006

(54) POWER SUPPLY, AND APPARATUS AND METHOD FOR OPERATING A POWER SUPPLY

(75) Inventors: Song Zhang, Naperville, IL (US); Yishu Shi, Buffalo Grove, IL (US); Christopher R. Bach, Elgin, IL (US); Michael Patrick Ryan, Crystal Lake, IL (US); Michael S. Beruscha, Algonquin, IL (US)

(73) Assignee: General Instrument Corportion, Horsham, PA (US)

(*) Notice: Subject to any disclaimer, the term of this patent is extended or adjusted under 35 U.S.C. 154(b) by 455 days.

(21) Appl. No.: 10/417,390

(22) Filed: Apr. 16, 2003

(65) Prior Publication Data

US 2004/0207404 A1    Oct. 21, 2004

(51) Int. Cl.
*H02J 7/00*    (2006.01)
(52) U.S. Cl. .......................... 307/64; 324/426
(58) Field of Classification Search ................ 324/427, 324/429, 433, 444, 426; 320/106; 307/64
See application file for complete search history.

(56) References Cited

U.S. PATENT DOCUMENTS 5,119,011 A * 6/1992 Lambert ..................... 320/136
5,477,150 A * 12/1995 Ham et al. .................. 324/536
5,825,100 A * 10/1998 Kim ............................. 307/66
6,392,383 B1 * 5/2002 Takimoto et al. ........... 320/115
6,803,678 B1 * 10/2004 Gottlieb et al. ............... 307/66

OTHER PUBLICATIONS

PacketCable Embedded MTA Primary Line Support Specification, PKT-SP-EMTA-PRIMARY-101-001128, Cable Television Laboratories, Inc., 2000, 38 pages.

* cited by examiner

*Primary Examiner*—Brian Sircus
*Assistant Examiner*—Daniel Cavallari
(74) *Attorney, Agent, or Firm*—Lawrence T. Cullen

(57) ABSTRACT

A power supply is configured to accept battery and external power sources, and is adapted for use in equipment in a broadband communications network. A first voltage detector detects a first voltage signal at an electrical path associated with the battery power source and a second voltage detector detects a second voltage signal at an electrical path associated with the external power source. A processor is responsive to the first and second voltage detectors and adapted to generate an electrical signal indicating whether the battery power source is present, charged and being used. A light emitting diode, responsive to the processor, displays, in an order of priority, whether the battery power source is present, charged or being used.

19 Claims, 3 Drawing Sheets

POWER SUPPLY, AND APPARATUS AND METHOD FOR OPERATING A POWER SUPPLY

FIELD OF THE INVENTION

This invention relates generally to signal measurement systems in power supplies, and, more particularly, to a power supply, and an apparatus and method for operating a power supply adapted for use in equipment in a broadband communications network.

BACKGROUND OF THE INVENTION

A communications network such as a cable network includes devices, such as multimedia terminal adapters (MTAs) and other equipment elements, which enable high-speed multimedia communications, including, among others, voice-over-internet-protocol (VoIP) communications, to be provided to customer premises.

Provisioning of communications in cable networks is functionally specified by various standards. Cable Television Laboratories, Inc. (CableLabs®), is an example of an organization that publishes interface specifications to ensure interoperability of equipment elements in hybrid fiber coax (HFC) cable networks providing high-speed multimedia communications using the Data Over Cable Interface Specifications (DOCSIS) protocol. CableLabs publishes, among other specifications, the PacketCable™ Embedded MTA Primary Line Support Specification (Interim publication), which defines functional requirements for MTAs.

Cable network equipment elements such as MTAs often contain multiple power sources, such as alternating current (AC) power sources, direct current (DC) power sources, and battery power sources, either integrated within equipment elements or packaged as power supplies adapted to work with equipment elements (hereinafter, all configurations of power sources will be referred to as "power supplies," for illustration purposes). Power supplies may be configured to operate using more than one power source, such as an AC power source and a battery power source.

Alerts may be generated when a power supply is interrupted, or is in jeopardy of interruption. For example, power supplies often provide multiple alerts regarding the status (es) of battery power sources. Current power supplies used in MTAs operating in DOCSIS-protocol HFC cable networks, however, such as a power supply available from American Power Corporation (APC), part number CP15U48S with a 7-position uninterruptible power supply cable, among others, can provide confusing status alerts regarding battery power sources.

Confusion typically results when a battery is missing, has just been replaced, or has recently been used and is not fully charged, because tests for multiple statuses (e.g., missing battery, replace battery, low battery) of the battery power supply are performed together, or treated equally for reporting purposes—when one problem with a battery is detected, multiple alerts are often triggered simultaneously. Unnecessary, untimely, expensive and time-consuming battery replacement or inspection may occur.

There is therefore a need for a method and apparatus for testing a power supply in a broadband communications newtork, which provides accurate and efficient detection, and prioritized reporting, of the status of a battery power source associated with the power supply.

SUMMARY OF THE INVENTION

According to an aspect of the present invention, the foregoing need is addressed by a method, for implementation by signal processing activity, of testing a power supply adapted for use in equipment providing services in a broadband communications network. The power supply is configured to accept a battery power source and an external power source. At a first periodic time, a first electrical signal associated with the battery power source is detected. Based on the first electrical signal, it is determined whether the battery power source is present. Based on whether the battery power source is present, at a second periodic time, a second electrical signal associated with the battery power source is detected. Based on the second electrical signal, it is determined whether the battery power source is charged. Based on whether the battery power source is present and charged, at a third periodic time, a third electrical signal associated with the external power source is detected. Based on the third electrical signal, it is determined whether the battery power source is being used. One of the statuses of the battery power source—whether the battery power source is present, charged or being used—is displayed, in an order of priority.

According to another aspect of the present invention, a power supply adapted for use in equipment in a broadband communications network is configured to accept a battery power source and an external power source, and includes a first voltage detector adapted to detect a first voltage signal at an electrical path associated with the battery power source; a second voltage detector adapted to detect a second voltage signal at an electrical path associated with the external power source; a processor responsive to the first voltage detector and the second voltage detector, adapted to receive the first voltage signal and the second voltage signal and generate an electrical signal indicating whether the battery power source is present, charged and being used based on the first voltage signal and the second voltage signal; and a light emitting diode responsive to the processor, adapted to receive the electrical signal and, based on the electrical signal, display, in an order of priority, one of a plurality of states, which indicates whether the battery power source is present, charged or being used.

According to a further aspect of a present invention, a multimedia terminal adapter providing voice-over-internet-protocol services in a broadband cable network is configured to accept a battery power source and an external power source, and includes a means for detecting a first voltage signal at an electrical path associated with the battery power source; a means for detecting a second voltage signal at an electrical path associated with the external power source; a means, responsive to the means for detecting the first voltage signal and the means for detecting the second voltage signal, for receiving and processing the first voltage signal and the second voltage signal; a means, responsive to the means for detecting, for generating an electrical signal indicating one of whether the battery power source is present, charged or being used based on the first voltage signal and the second voltage signal; and a means for receiving the electrical signal and displaying, in an order of priority, whether the battery power source is present, charged or being used.

Advantages of the various embodiments of the present invention will become readily apparent to those skilled in the art from the following description of the preferred embodiment(s) of the invention, which has been shown and described by way of illustration. As will be realized, the invention is capable of other and different embodiments, and its details are capable of modifications in various respects. Accordingly, the drawings and description are to be regarded as illustrative in nature, and not as restrictive.

DETAILED DESCRIPTION OF THE PREFERRED EMBODIMENT(S)

Figure 1:
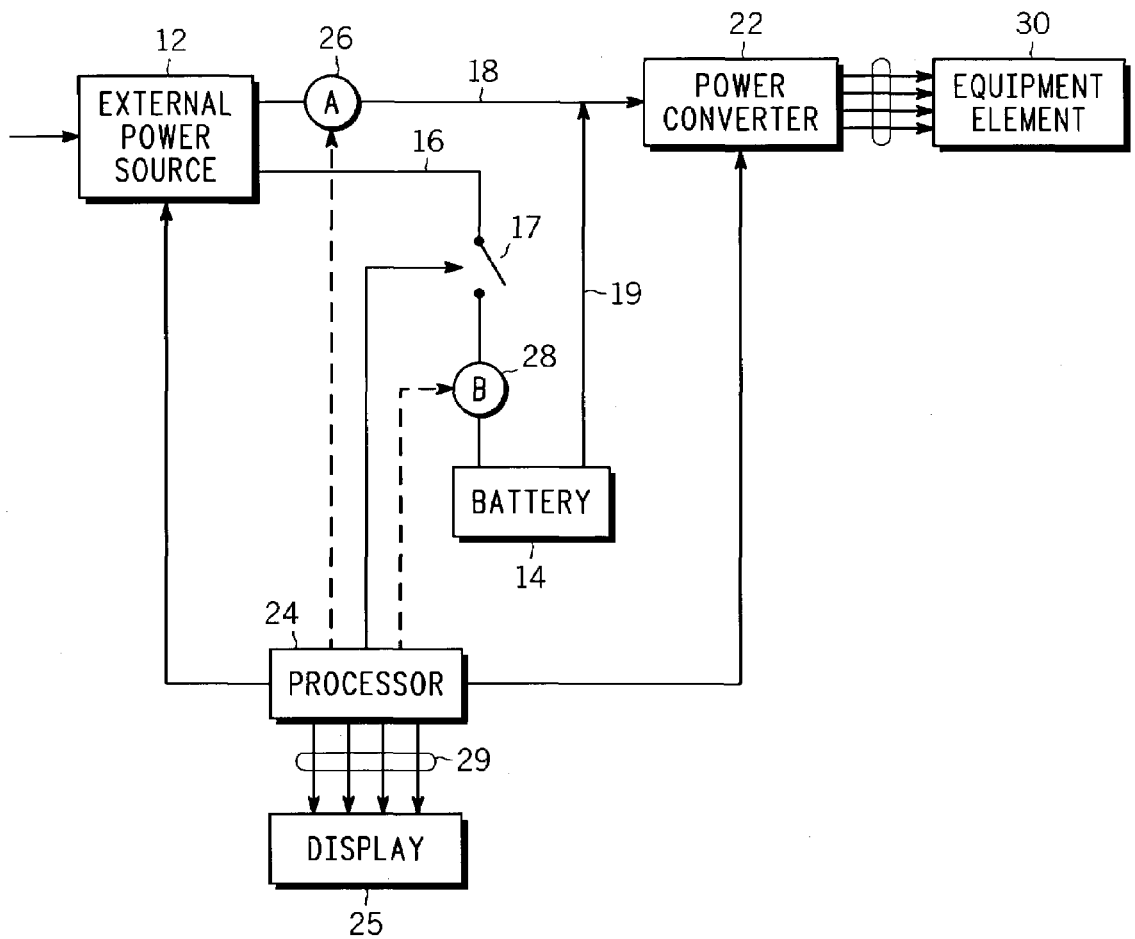
FIG. 1 is a block diagram of a power supply in accordance with a preferred embodiment of the present invention.

Turning now to the drawings, wherein like numerals designate like components, FIG. 1 is a block diagram of a power supply 10 in accordance with a preferred embodiment of the present invention. Power supply 10 is preferably adapted for use in equipment (not shown) providing voice-over-internet-protocol services in a broadband cable network, and, as shown, is responsive to an equipment element 30. Equipment element 30 is preferably a multimedia terminal adapter designed to meet PacketCable™'s Embedded MTA Primary Line Support Specification (Interim publication), incorporated herein by reference. An example of a multimedia terminal adapter is Motorola, Inc.'s CG5500E, commercially available from Motorola.

Power supply 10 is operable using both an external power source 12 and a battery power source 14 (hereinafter "battery"), although power supply 10 may include fewer, more or different power sources. External power source is preferably a local alternating current (AC) power source, but may be another type of power source, such as a direct current (DC) power source, or a network power source. The choice of battery 14 is application-dependent, many suitable types of batteries being well-known and commercially available from a variety of sources.

An electrical path 16 between external power source 12 and battery 14 includes a switch 17, which enables power supply 10 to operate using either external power source 12 or battery 14. Both external power source 12 and battery 14 deliver power, via electrical paths 18 and 19, respectively, to a power converter 22. Power converter 22 may be, for example, and AC-to-AC power converter, or a DC-to-DC power converter, or another type of power converter, such converters being well-known and commercially available from a variety of sources.

A processor 24 is responsive to external power source 12, battery 14, power converter 22, and a display 25. Processor 24 provides control and detection of signals to/from external power source 12, battery power source 14, and power converter 22; performs monitoring and analysis of electrical signals at point A 26 on electrical path 18 associated with external power source 12, and at point B 28 on electrical path 16 between battery 14 and external power source 16; and generates output(s) 29 based on received electrical signals, such as voltages, at points A 26 and B 28. Monitoring of electrical signals at points A 26 and B 28 preferably includes sensing the presence of a short circuit to ground (low) or an open circuit condition (float high). An alarm active state may be defined as an open circuit condition (float high). An alarm inactive state may be defined as a short circuit to ground (low).

Display 25 is responsive to processor 24, receiving and displaying outputs 29 to an end-user or network operator. Display 25 may be, for example, a dual-color light emitting diode (LED), or another suitable light-based, audio-based or other type of device.

During normal operation in accordance with a preferred embodiment of the present invention, power supply 10 begins operation using external power source 12, which is preferably AC power, but which may be another source of power. Upon commencing operation, a test of an electrical signal, such as a voltage, at point A 26 is performed by processor 24 (hereinafter referred to as the "AC Voltage Test"). If processor 24 detects an inadequate voltage for operation of power supply 10, for example, if the voltage at point A 26 is less than a threshold, such as 15.2 volts, then power supply 10 does not become operational.

When the AC Voltage Test detects an adequate voltage at point A 26, then processor 24 begins to perform tests on other power sources in power supply 10, such as battery 14.

A first test related to battery 14, performed periodically, for example, every five seconds, determines whether battery 14 is present or missing (hereinafter referred to as the "Missing Battery Test"). To determine whether battery 14 is present, processor 24 tests an electrical signal, such as a voltage, at point B 28. If the voltage is less than a threshold, such as one volt, then processor 24 concludes that battery 14 is absent, and directs an output 29 to display 25, and display 25 indicates to a user that battery 14 is missing from power supply 10. Display 25 is preferably a dual-color LED, and the user preferably receives an indication of missing battery 14 via a solid red state of the LED. If battery 14 is missing, the AC Voltage Test is performed again, and further tests are preferably not performed on battery 14.

A second test related to battery 14, performed periodically, for example, every seven days, determines whether battery 14 is faulty or worn out and needs to be replaced (hereinafter referred to as the "Replace Battery Test"). If the Missing Battery Test indicates that battery 14 is present, processor 24 examines an electrical signal, such as a voltage, at point B 28. The examined voltage may be the same voltage sample examined during the Missing Battery Test, or it may be another voltage sample. If the voltage is within a predetermined range, for example, greater than one volt but less than 10.2 volts, then processor 24 concludes that battery 14 is faulty or worn out, and needs to be replaced. Processor 24 directs an output 29 to display 25, and display 25 indicates to the user that battery 14 needs to be replaced. The indication received by the user is preferably a flashing red state of the dual-color LED.

If battery 14 needs to be replaced, the AC Voltage Test is preferably performed again, and no new tests are performed on battery 14 until battery 14 has been replaced. After battery 14 has been replaced, the Replace Battery Test is not performed for a period of time, for example, seven days, to allow the new battery to become charged, and to avoid prematurely indicating to the user that the new battery needs to be replaced.

A third test related to battery 14 determines whether battery 14 has an adequate charge (hereinafter referred as the "Low Battery Test"). The Low Battery Test is first performed when the Replace Battery Test indicates that battery 14 is in good condition, and is subsequently performed periodically, for example, every five seconds, when battery 14 is in use (discussed further below with reference to the Battery Usage Test) to operate power supply 10.

To determine whether battery 14 has an adequate charge, processor 24 examines an electrical signal, such as a voltage, at point B 28. The examined voltage may be the same voltage sample examined for the Missing Battery Test or the Replace Battery Test, or it may be another voltage sample. If the voltage is within a predetermined range, for example, greater than 10.2 volts but less than 11.4 volts, then processor 24 concludes that battery 14 has an inadequate charge. Processor 24 directs an output 29 to display 25, and display 25 indicates to the user that battery 14 has an inadequate charge. The indication received by the user is preferably a flashing yellow state of the dual-color LED.

A fourth test related to battery 14 determines whether battery 14 is currently being used to operate power supply 10 (hereinafter referred as the "Battery Usage Test"). The Battery Usage Test is initially performed after the Low Battery Test has been performed, and is subsequently performed periodically, for example, every second, after battery 14 has been found to be in use. To determine whether battery 14 is being used, processor 24 examines an electrical signal, such as a voltage, at point A 26. The examined voltage may be the same voltage sample examined for the AC Voltage Test, or it may be another voltage sample. If the voltage is within a first predetermined range, for example, less than 10 volts, then power supply 10 is operating on battery power, and processor 24 directs an output 29 to display 25, and display 25 indicates to the user that power source 10 is operating on battery power. The indication received by the user is preferably a solid yellow state of the dual-color LED.

If the voltage at point A 26 is within a second predetermined range, for example, ten or more volts, then battery 14 is not being used to operate power supply 10, and the AC Voltage Test is repeated.

As discussed above in connection with the Low Battery Test, if the Battery Usage Test indicates that battery 14 is in use, the Low Battery Test is performed periodically, for example, every five seconds. If the battery is in use, and the Low Battery Test indicates that battery 14 has a charge of less than a predetermined amount, for example, 10.2 volts, then power supply 10 may be shut down.

If the Battery Usage Test indicates that another power source besides battery 14 is in use, for example, if the voltage at point A 26 is greater than a predetermined threshold, for example, 15.2 volts, indicating that AC Power Source 12 is in use, then processor 24 directs an output 29 to display 25, and display 25 indicates to the user that power source 10 is not operating on battery power. The indication received by the user is preferably an unlit state of the dual-color LED. When battery 14 is not in use, tests on battery 14 are repeated, starting with the Missing Battery Test, and other indicators, such as the low battery indicator, are cleared. The Replace Battery Test, however, is preferably not performed for period of time, for example, seven days, after power supply 10 has switched from using battery 14 to another power source, to allow battery 14 time to re-charge, if possible.

A battery charger (not shown) may be under control of processor 24, and be adapted to charge battery 14 in accordance with the results of the Replace Battery Test, the Low Battery Test and the On Battery Test.

Figure 2:
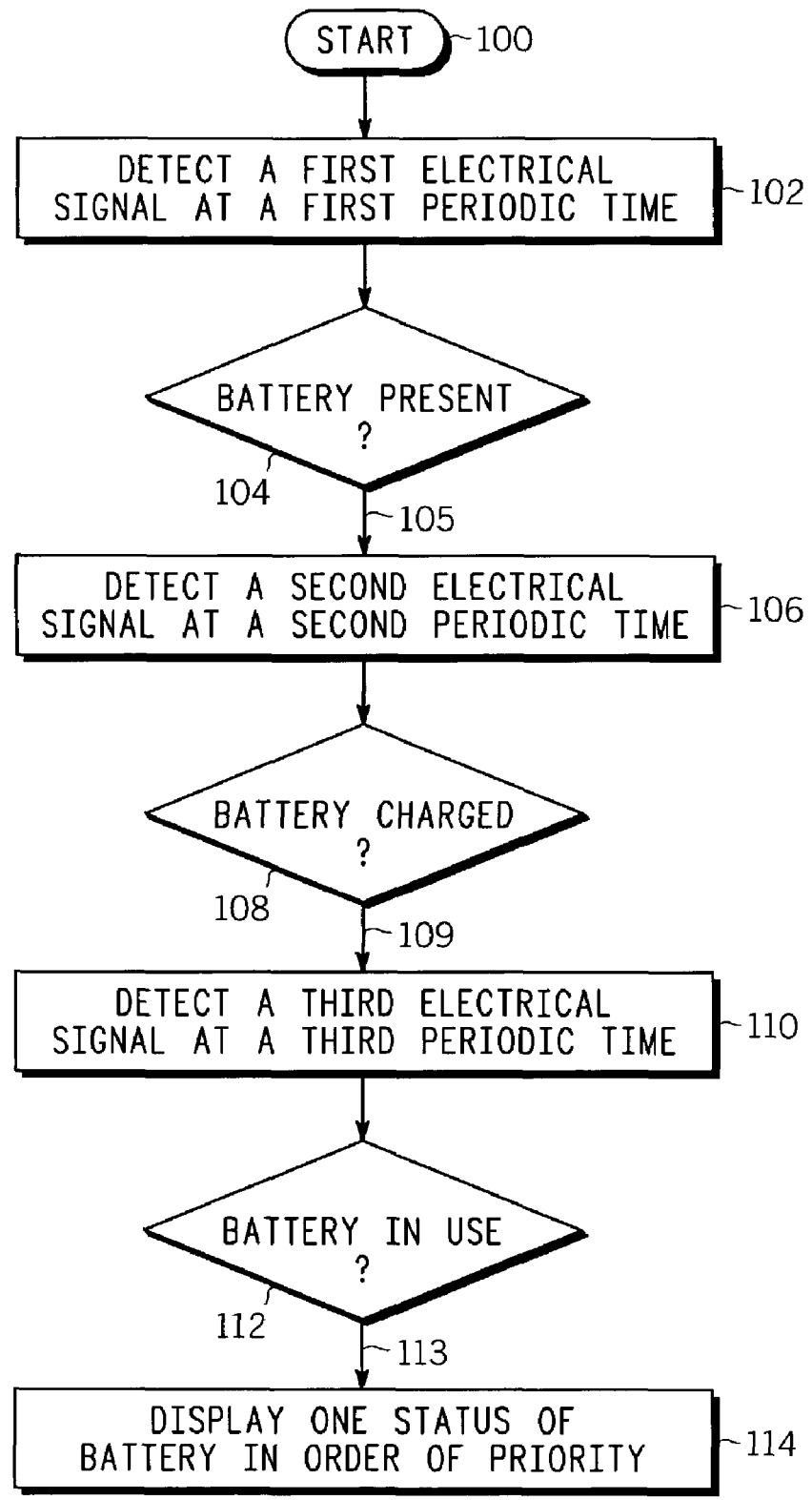
FIG. 2 is a flowchart of a method of testing the power supply depicted in FIG. 1, according to a preferred embodiment of the present invention.

One preferred embodiment of a method of testing power supply 10, which is preferably adapted for use by signal processing activity in an equipment element providing services in a broadband cable network, is outlined in the flowchart of FIG. 2. The method starts at block 100, and continues to block 102, where at a first periodic time, a first electrical signal associated with battery 14 is detected. At block 104, it is determined whether battery 14 is present based on the first electrical signal. Output 105 of block 104 indicates whether battery 14 is present or absent. Block 106 includes the step of detecting, based on output 105, a second electrical signal at a second periodic time. At block 108, it is determined whether battery 14 is charged based on the second electrical signal. Output 109 of block 108 indicates whether battery 14 is viably charged. Based on output 109, block 110 includes the step of detecting a third electrical signal at a third periodic time. At block 112, it is determined whether battery 14 is being used to operate power supply 10. Output 113 of block 112 indicates whether battery 14 is in use. Based on output 113, one status of battery 14, that is, whether battery 14 is present, charged or being used, is displayed in an order of priority, at block 114.

Thus, in accordance with the preferred embodiments of the present invention described herein, only one indication of the status of battery 14 is provided to a user at any one time, and only the most relevant, or highest priority, status is reported to the user. In this manner, more efficient and accurate battery maintenance in broadband communication network equipment is possible.

Figure 3:
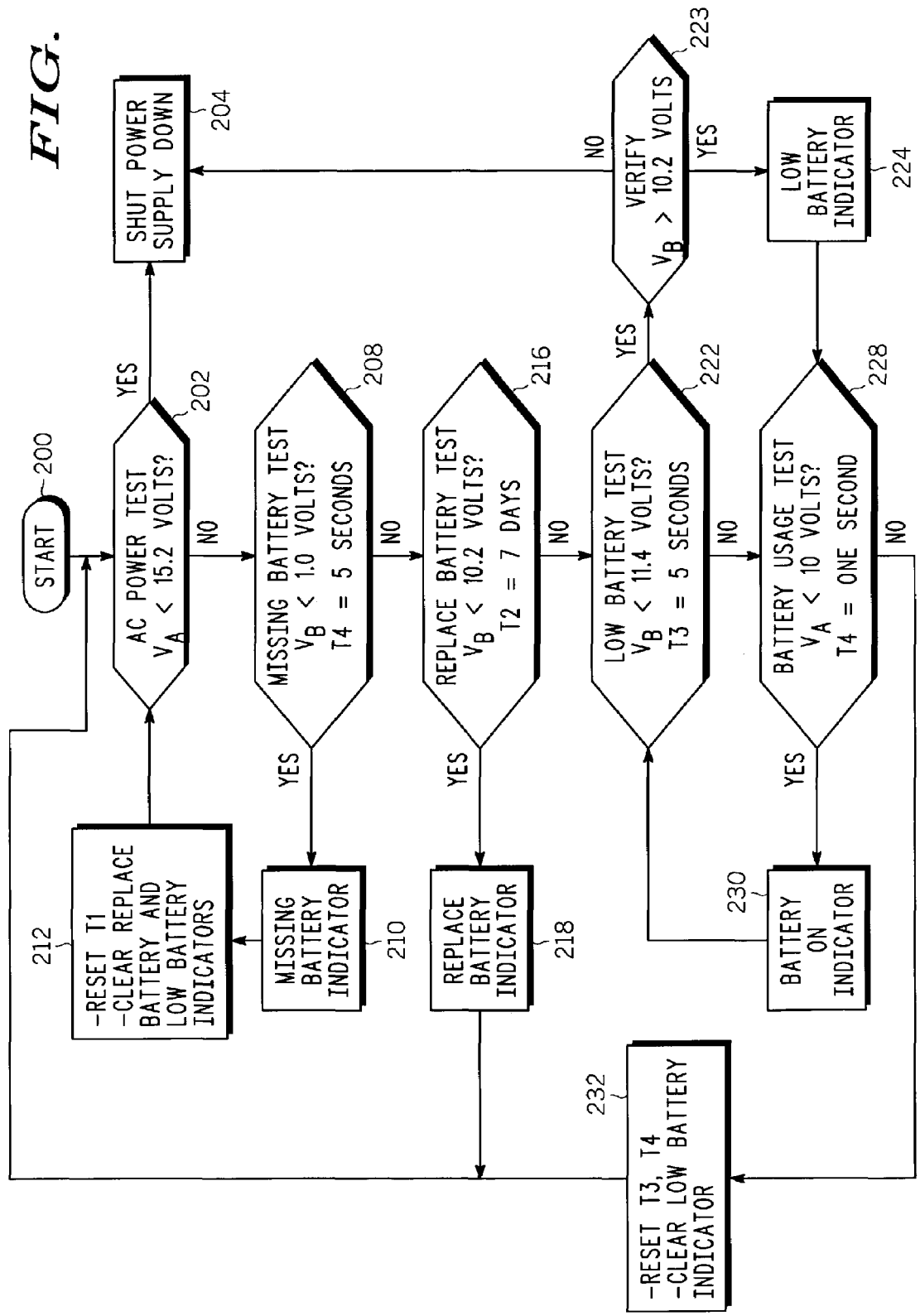
FIG. 3 is a flowchart of a method of testing the power supply depicted in FIG. 1, according to another preferred embodiment of the present invention.

FIG. 3 is a flowchart of a method of testing the power supply depicted in FIG. 1, according to another preferred embodiment of the present invention. The method starts at block 200, and continues at block 202, where, upon start-up of power supply 10, the AC Power Test is performed. If a voltage at point A 26 is less than 15.2 volts, power supply 10 is shut down, at block 204.

When the AC Power Test detects an adequate voltage at point A 26, the Missing Battery Test is performed at block 208, according to a timer T1 (not shown), preferably every five seconds. If a voltage at point B 28 is less than one volt, battery 14 is deemed to be missing, and a missing battery indicator is provided to a user at block 210. At block 212, timer T1 is re-set, and no further indicators regarding battery 14 are provided while battery 14 is missing (that is, as discussed further below, the replace battery and low battery indicators are cleared). The method then returns to block 202, where the AC Power Test is performed.

When, at block 208, battery 14 is deemed to be present, the Replace Battery Test is performed at block 216, every seven days, according to a timer T2 (not shown), preferably every seven days. If a voltage at point B 28 is less than 10.2 volts, battery 14 needs to be replaced, and a replace battery indicator is provided to the user at block 218. The method then returns to block 202, where the AC Power Test is performed.

If the Replace Battery Test indicates that battery 14 is viably charged at start-up, then the Low Battery Test is performed at block 222, according to a timer T3 (not shown), preferably every five seconds. If a voltage at point B 28 is less than 11.4 volts, but remains greater than 10.2 volt (that is, battery 14 is still viable in accordance with the Replace Battery Test conditions), then, as provided at block 223, battery 14 is deemed to have a low charge, and a low battery indicator is provided at block 224.

After the Low Battery Test has been performed, assuming battery 14 has remained viably charged based on the determination of the voltage at point B 28 at block 223 (if not, power supply 10 is shut down, at block 204), the method continues at block 228, where the Battery Usage Test is preferably performed every second, according to a timer T4 (not shown). If a voltage at point A 26 is less than 10 volts, then power supply 10 is operating under the power of battery 14, an on-battery indicator is provided at block 230, and the method returns to perform the Low Battery Test at block 222.

If the Battery Usage Test indicates power supply 10 is not operating on battery power, at block 232, timers T3 and T4 are reset, and the low battery indicator is cleared, then the method returns to perform the AC Power Test at block 202.

Although power supply 10 has been described herein in terms of specific functional elements and relationships, it is contemplated that power supply 10 may be configured in a variety of ways, such as with programmed processors, discrete logical/circuit elements, application-specific integrated circuits (ASICs), or any combination of the foregoing. Also, when one element is responsive to another element, the elements may be directly or indirectly coupled.

Functional elements of power supply 10 may be packaged together or individually, or may be implemented by fewer, more or different devices, and may be either integrated within equipment elements or adapted to work with individual equipment elements.

With respect to implementation of certain aspects of the invention, the methods described herein may be implemented using computer software stored on any computer-readable medium (or electronically), or using firmware, or using software, or any combination thereof. In addition, such aspects of the invention are not limited to any specific embodiments of the computer program or signal processing methods. Although the PacketCable specifications have been specifically referred to herein, the embodiments of present invention are applicable to architectures described by different specifications, and to power sources in general, and the principles of the embodiments of the present invention applicable to broadband cable communication systems may also apply to other types of communication systems.

It will furthermore be apparent that other and further forms of the invention, and embodiments other than the specific embodiments described above, may be devised without departing from the spirit and scope of the appended claims and their equivalents, and therefore it is intended that the scope of this invention will only be governed by the following claims and their equivalents.

The invention claimed is:

1. A method, adapted for implementation by signal processing activity, of testing a power supply adapted for use in equipment in a broadband communications network, the power supply configured to accept a battery power source and an external power source, the method comprising:
at a first periodic time, detecting a first electrical signal associated with the battery power source;
based on the first electrical signal, determining whether the battery power source is present;
based on whether the battery power source is present, at a second periodic time, detecting a second electrical signal associated with the battery power source;
based on the second electrical signal, determining whether the battery power source is charged;
based on whether the battery power source is present and charged, at a third periodic time, detecting a third electrical signal associated with the external power source;
based on the third electrical signal, determining whether the battery power source is being used; and
displaying, in an order of priority, whether the battery power source is present, charged and being used.

2. The method according to claim 1, wherein the order of priority comprises whether the power source is present, charged and being used, respectively.

3. The method according to claim 2, wherein when the battery power source is absent, displaying a first indicator to the user.

4. The method according to claim 3, wherein the first, second and third electrical signals comprise voltages.

5. The method according to claim 4, wherein when the first voltage is less than 1 volt, determining that the battery power source is absent.

6. The method according to claim 4, further comprising:
when the battery power source is absent, not displaying whether the battery power source is charged and whether the battery power source is being used.

7. The method according to claim 6, wherein the step of determining whether the battery power source is charged further comprises:
when the battery power source is present, determining one of whether the battery power source needs to be replaced and whether the battery power source is low.

8. The method according to claim 7, wherein when the first electrical signal is greater than one volt, and the second electrical signal is less than 10.2 volts, determining the battery power source needs to be replaced.

9. The method according to claim 7, wherein when the first electrical signal is greater than one volt, and the second electrical signal is between 10.2 volts and 11.4 volts, determining the battery power source is low.

10. The method according to claim 7, wherein when one of the battery power source needs to be replaced and the battery power source is low, displaying a second indicator to the user.

11. The method according to claim 10, wherein the step of determining whether the battery power source is in use further comprises:
when the battery power source is present, does not need to be replaced, and is not low, determining whether the battery power source is supplying power to the power supply.

12. The method according to claim 11, wherein when the third electrical signal is less than 10 volts, determining the battery power source is in use.

13. The method according to claim 12, wherein when the battery power source is present, does not need to be replaced, is not low and is supplying power to the power supply, displaying a third indicator to the user.

14. The method according to claim 13, further comprising: when the battery is not in use, re-setting the first, second and third periodic times.

15. The method according to claim 14, wherein the first, second and third indicators comprise states of a dual-color light-emitting diode.

16. A power supply adapted for use in equipment in a broadband communications network, the power supply configured to accept a battery power source and an external power source, comprising:
a first voltage detector adapted to detect a first voltage signal at an electrical path associated with the battery power source;
a second voltage detector adapted to detect a second voltage signal at an electrical path associated with the external power source;
a processor responsive to the first voltage detector and the second voltage detector, adapted to receive the first voltage signal and the second voltage signal and generate an electrical signal indicating whether the battery power source is present, charged and being used based on the first voltage signal and the second voltage signal; and
a light emitting diode responsive to the processor, adapted to receive the electrical signal and, based on the electrical signal, display, in an order of priority, one of a plurality of states indicating whether the battery power source is present, charged and being used.

17. The apparatus according to claim 16, wherein the power supply is adapted for use in a multimedia terminal adapter.

18. The apparatus according to claim 17, wherein the multimedia terminal adapter provides voice-over-internet-protocol services in a hybrid fiber coax cable network using Data Over Cable Interface Specifications.

19. A multimedia terminal adapter providing voice-over-internet-protocol services in a broadband cable network, configured to accept a battery power source and an external power source, comprising:

means for detecting a first voltage signal at an electrical path associated with the battery power source;

means for detecting a second voltage signal at an electrical path associated with the external power source;

means, responsive to the means for detecting the first voltage signal and the means for detecting the second voltage signal, for receiving and processing the first voltage signal and the second voltage signal;

means, responsive to the means for detecting, for generating an electrical signal indicating one of whether the battery power source is present, charged and being used based on the first voltage signal and the second voltage signal; and means for receiving the electrical signal and displaying, in an order of priority, whether the battery power source is present, charged and being used.

* * * * *